United States Patent
Vainikka et al.

(10) Patent No.: US 8,831,596 B2
(45) Date of Patent: Sep. 9, 2014

(54) MOBILITY MANAGEMENT

(75) Inventors: Markku Juha Vainikka, Kiviniemi (FI); Vinh Van Phan, Oulu (FI); Ling Yu, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 508 days.

(21) Appl. No.: 13/000,648

(22) PCT Filed: Jun. 27, 2008

(86) PCT No.: PCT/EP2008/058299
§ 371 (c)(1),
(2), (4) Date: Jan. 18, 2011

(87) PCT Pub. No.: WO2009/155992
PCT Pub. Date: Dec. 30, 2009

(65) Prior Publication Data
US 2011/0111753 A1    May 12, 2011

(51) Int. Cl.
*H04W 36/00*    (2009.01)
*H04W 36/32*    (2009.01)
(52) U.S. Cl.
CPC ........................... *H04W 36/32* (2013.01)
USPC ........................................ 455/425; 455/436
(58) Field of Classification Search
USPC ............... 455/425, 436, 437, 439, 552.1
See application file for complete search history.

(56) References Cited

U.S. PATENT DOCUMENTS

| | | | |
|---|---|---|---|
| 6,490,452 B1 * | 12/2002 | Boscovic et al. | 455/436 |
| 2004/0058678 A1 * | 3/2004 | deTorbal | 455/437 |
| 2006/0166699 A1 * | 7/2006 | Aghvami et al. | 455/552.1 |
| 2008/0119182 A1 | 5/2008 | Kwun et al. | 455/424 |
| 2008/0125125 A1 | 5/2008 | Choi et al. | 455/436 |
| 2009/0005045 A1 * | 1/2009 | Kuriki et al. | 455/436 |
| 2011/0026492 A1 * | 2/2011 | Frenger et al. | 370/331 |

FOREIGN PATENT DOCUMENTS

| | | |
|---|---|---|
| EP | 1 058 473 A1 | 12/2000 |
| EP | 1 429 575 A1 | 6/2004 |
| EP | 1 777 977 A1 | 4/2007 |
| WO | WO 2008/044283 A1 | 4/2008 |

OTHER PUBLICATIONS

IEEE S802.16j-06/227, Nov. 15, 2006, Kim et al., "Group Handover on the Mobile RS", 6 pgs.
3GPP TR 25.9123 V9.0.0 (Dec. 2009), $3^{rd}$ Generation Partnership Project; Technical specification Group Radio Access Network; Requirements for Evolved UTRA (E-UTRA) and Evolved UTRAN (E-UTRAN) (Release 9), 18 pgs.

* cited by examiner

*Primary Examiner* — Myron K Wyche
(74) *Attorney, Agent, or Firm* — Harrington & Smith (57) ABSTRACT

The present invention concerns mobility management. A method is proposed that involves obtaining mobility management properties for a plurality of terminals served by an access node, as well as grouping the plurality of terminals into groups based on correlating the obtained mobility management properties of the plurality of terminals. Decisions on the necessity for a handover are taken per group and then forwarded per group to a target access node. Also, a corresponding apparatus is proposed.

18 Claims, 6 Drawing Sheets

MOBILITY MANAGEMENT

FIELD OF THE INVENTION

The present invention generally relates to improvements in mobility management in mobile communication networks. More particularly, it relates to methods, apparatuses/modules, and computer program products in this regard.

BACKGROUND OF THE INVENTION

Mobile communication has made considerable progress in recent years. Starting from a traditional circuit switched (CS) approach as e.g. pursued in the Global System of Mobile Communication (GSM), the technological evolution has made its way towards packet switched (PS) systems such as those operating for example on the basis of the Internet Protocol (IP). Examples of such communication systems are the Universal Mobile Telecommunication Standard (UMTS) also referred to as Third Generation (3G) telecommunication system, or a system known as IMS system (IP Multimedia System), or even a network operating on the basis of the Session Initiation Protocol SIP. While in former systems, speech or voice was a main aspect of "media" as payload data to be conveyed via the communication system, nowadays all kind of media are focused on as payload, e.g. speech, music (audio), images (still images, i.e. pictures, as well as moving images, i.e. videos), executable program code, text data, and many other types or combinations of media types. The expression "media" is to be understood as not being limited to a specific type of media but is intended to be used in its broadest possible meaning.

With the emerging development of new systems, those systems coexist in parallel and interoperability is one aspect of the development. In particular in case of users represented by their terminals, e.g. mobile stations MS in GSM or user equipment UE in UMTS and/or IMS that may be illustrated/referred to also as "handsets") that may move and/or roam throughout the communication networks, the users expect seamingless services of high quality to be provided to them, irrespective of the current communication system and/or location within one or the other of those systems in which they camp.

Services provided to users are provisioned, "at the last hop", via access nodes. An access node in this sense is serving a user's terminal. In a roaming scenario, also commonly referred to as Handover HO, a user represented by his or her terminal, is handed over from one (currently serving) access node to a new (subsequently serving) access node (so-called target node). A selection or determination of a target node is taken based on mobility management procedures. Mobility management encompasses signaling to be exchanged between network entities. Signaling amount, however, increases with an increasing number of users in the network.

Document EP 1 429 575 proposes using lower level, i.e., L2 synch HO instead of L3 RRC and also support mass HO with mass HO command broadcast to group of users in the field of satellite communications.

Document EP 1 777 977 discloses a radio communication system enabling an inter-frequency handover for subscribers between different operators.

Document IEEE S802.16j-06/227 dated 2006 Nov. 15 proposes a group handover on a mobile relay server, MRS, based on a movement of the MRS. In such a scenario, all terminals or mobile stations served by the moving MRS are handed over.

Document EP-A1-1 058 473 discloses group handover in a cellular communications network in order to relieve congestion in an overloaded cell by handing over a group of calls to an under-loaded cell. Corresponding HO commands are sent to all terminals within a respective group.

The present invention is generally related to any cellular system where user mobility is supported. Notwithstanding this, it is particularly beneficial for so-called advanced mobile communication networks, including 3GPP Long Term Evolution (LTE) Release 8 and beyond, referred to as LTE-Advanced (LTE-A), aiming towards future ITU International Mobile Telecommunications—Advanced (IMT-A) systems where an optimized protocol overhead is required in the sense that it is optimized if kept at a minimum.

In 3GPP TR 25.913, the mobility requirement for E-UTRAN is proposed to optimize delay and packet loss during intra system handover. More specifically for E-UTRAN, Voice and other real-time services supported in the CS domain in R6 shall be supported by E-UTRAN via the PS domain with at least equal quality as supported by UTRAN (e.g. in terms of guaranteed bit rate)-over the whole of the speed range. The impact of intra E-UTRA handovers on quality (e.g. interruption time) shall be less than or equal to that provided by CS domain handovers in GERAN. The requirements on IMT-A system is under discussion at the moment, but mobility requirements are seen similar to those of E-UTRAN at least.

SUMMARY OF THE INVENTION

It is hence an object of the present invention to provide for corresponding improvement in mobility management compared to the hitherto known scenarios.

According to exemplary embodiments of the present invention, this object is for example achieved by the following exemplary aspects of a method, and apparatus/module, and computer program product exemplarily embodying a respective aspect of the invention, as outlined herein below, together with respective individual further refinements of the above exemplary aspects:

A method aspect comprises obtaining mobility management properties for a plurality of terminals served by an access node, grouping the plurality of terminals into groups based on correlating the obtained mobility management properties of the plurality of terminals, and deciding on the necessity for a handover per group, and forwarding the decision to a target access node.

According to individual sub-aspects of the method aspect:
the obtaining comprises receiving mobility management properties measured by the access node for the plurality of terminals, and/or receiving mobility management properties measured by each of the plurality of terminals;
the mobility management properties of a respective terminal comprise at least one of the following parameters: location of the terminal and/or variation thereof, traveling speed of the terminal and/or variation thereof, traveling direction of the terminal and/or variation thereof, received signal strength indicator for a terminal and/or variation thereof, bit error rate for a terminal and/or variation thereof;
the deciding further comprises evaluating at least one set of mobility management properties associated to one of the terminals of a group;
the deciding further comprises marking at least one set of mobility management properties that is received prior to other sets of mobility management properties associated to terminals of the group for being evaluated for deciding;

the grouping further comprises correlating at least one common mobility management parameter in the obtained mobility management properties;

the forwarding of the decision further comprises sending at least one handover preparation request related to one or more terminals of a group to a target access node;

the forwarding of the decision takes place via an interface between access nodes within the network side;

the sending of the handover preparation request takes place via an interface between access nodes within the network side;

the method further comprising invalidating a decision on the necessity for handover for an individual terminal in a group, if the obtained mobility management properties of the individual terminal after the deciding do not necessitate a handover;

wherein the invalidating of the decision further comprises sending an invalidation request related to the individual terminal to a target access node;

the sending of the invalidation request takes place via an interface between access nodes within the network side.

An apparatus (e.g. access node) aspect comprises an obtaining means configured to obtain mobility management properties for a plurality of terminals served by an access node, a processing means configured to correlate the obtained mobility management properties of the plurality of terminals, group the plurality of terminals into groups based thereon, decide on the necessity for a handover per group, and a transmitting means configured to forward the decision to a target access node.

According to individual sub-aspects of the access node aspect:

the obtaining means comprises a receiver configured to receive mobility management properties measured by the access node for the plurality of terminals, and/or receive mobility management properties measured by each of the plurality of terminals;

the processing means is configured to process the mobility management properties of a respective terminal which comprise at least one of the following parameters location of the terminal and/or variation thereof, traveling speed of the terminal and/or variation thereof, traveling direction of the terminal and/or variation thereof, received signal strength indicator for a terminal and/or variation thereof, bit error rate for a terminal and/or variation thereof;

the processing means is further configured to evaluate at least one set of mobility management properties associated to one of the terminals of a group;

the processing means is further configured to mark at least one set of mobility management properties that is received prior to other sets of mobility management properties associated to terminals of the group for being evaluated for deciding;

the processing means is further configured to correlate at least one common mobility management parameter in the obtained mobility management properties;

the transmitting means is configured to forward the decision by sending at least one handover preparation request related to one or more terminals of a group to a target access node;

the transmitting means is configured to forward of the decision via an interface between access nodes within the network side;

the transmitting means is configured to send the handover preparation request via an interface between access nodes within the network side;

the processing means is further configured to invalidate a decision on the necessity for handover for an individual terminal in a group, if the obtained mobility management properties of the individual terminal after the deciding do not necessitate a handover;

the processing means is configured to instruct the transmitting means to send an invalidation request related to the individual terminal to a target access node;

the transmitting means is configured to send the invalidation request via an interface between access nodes within the network side.

A module aspect involves that the apparatus is realized as a module being a chipset or a chipcard insertable to another apparatus; e.g. the module is a chipset or chipcard insertable to an access node.

A computer program product aspect comprises software code portions which, when executed on a processor, perform any of the aspects of the above method aspects.

In contrast to current cellular systems where mobility management is based on decisions taken for individual users, according to aspects of the present invention, a correlation of the multiple users' mobility management properties such as locations and travelling speed/direction is now taken into account in the proposed improved mobility management scheme. Namely, there are cases in which e.g. the locations of the users are inherently correlated, for instance in case of commuters in public transportation in big cities, passengers in long-distance car/bus/train, etc. It is a matter of fact that it can be expected that active users therein likely experience similar mobility management properties and, in particular, handover control. Therefore, smart predictive handover control over such highly correlated multi-users is proposed herein to be applied on a per group basis to optimize handover control and performance for advanced cellular networks. Thus, a predictive and/or preparatory Handover Control of Correlated Multi-users in Advance Cellular Systems is proposed which is based on exploring the correlation among multiple users' MM properties such as e.g. location and travelling speed/direction etc., to make predictive mass handover control on groups of users.

Thus, with the present invention being realized, at least some of the following advantages can be achieved, whether individually or in aggregation for a respective particular exemplary embodiment:

The proposed predictive mass (or groupwise) handover decision and preparation decreases the delay/interruption time during handover.

An invalidation of predicted handover for individual user terminals (also referred to as "False alarm indication") makes the predictive mass handover control more robust and resource efficient by taking into account false or insufficient correlation of the users and/or a change of user terminals' condition (e.g. due to leaving the bus/train/car or a transition from active to idle state during handover, or a disappearing obstacle between access node and terminal during the movement of the terminal).

With a further development of positioning technologies in relation to location-based services, future mobile equipments are likely equipped with reasonable accurate location-tracking capability. The correlation checking of the users in a BS or Node_B is thus already now feasible and easy.

This invention can be implemented in current GSM/WCDMA products without change of the standardisation. It can also be included in future standards e.g. those such as 3GPP LTE Rel'8 E-UTRAN, 3GPP Rel'9 or IMT-A.

BRIEF DESCRIPTION OF THE DRAWINGS

The invention will be readily understood when read in conjunction with the accompanying drawings, which shows in FIG. 1 a system overview illustrating some system constituents in order to explain at least some aspects of the present invention.

DESCRIPTION OF EXEMPLARY EMBODIMENTS

It is to be noted that the examples given in conjunction with the present invention are not intended to be limiting in any way. Rather, specific terminology as used in some passages in this document is adopted as an example only to simplify the description of the present invention and to illustrate a particular case to which the present invention may advantageously be applicable. This, however, is not intended to exclude any other field of application for the present invention.

Figure 1:
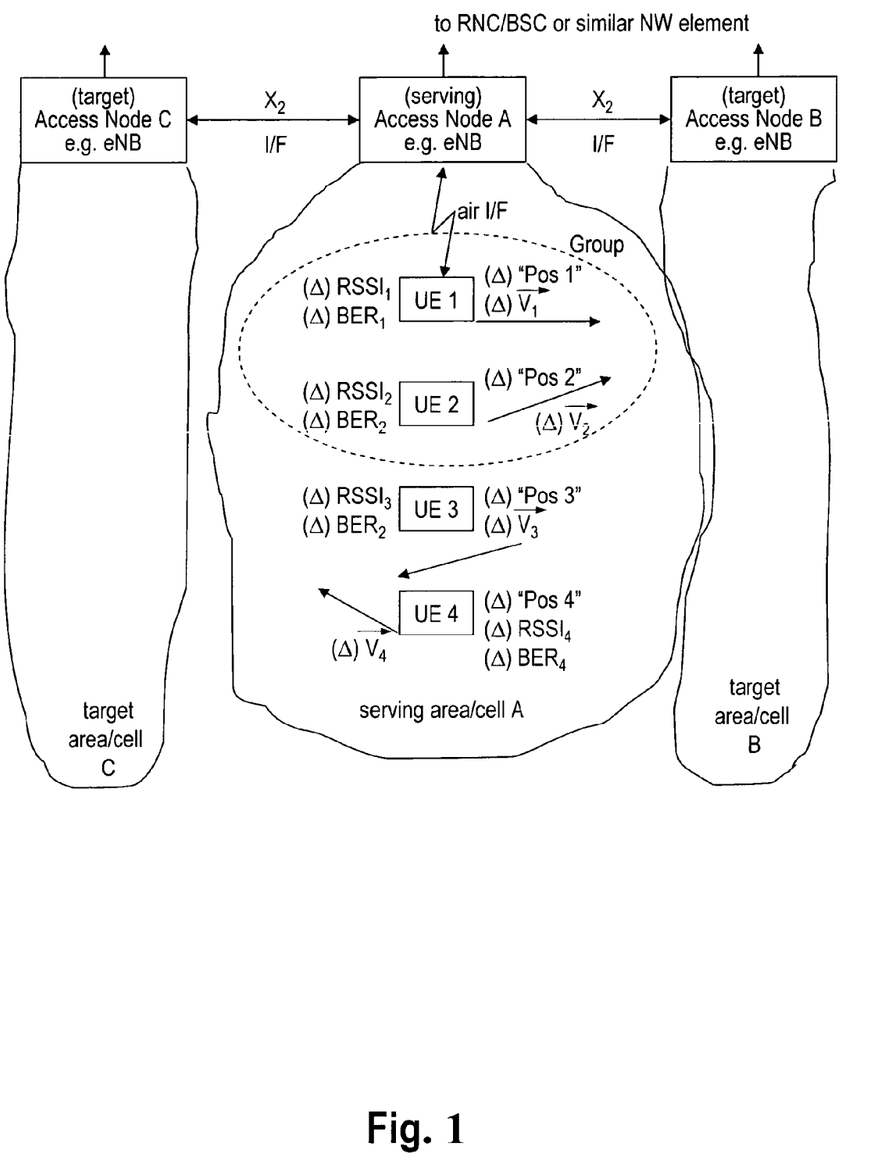

FIG. 1 shows a system overview illustrating some system constituents in order to explain the present invention.

As shown, several terminals such as user equipments UE1, UE2, UE3, UE4 are communicating via an air interface with an access node A. The access node A is assumed to be a serving access node in the illustrated situation. The access node A may for example be a base station BS (in GSM) or a Node_B (in UMTS) or an eNB, i.e. an E-UTRAN Node_B. Nevertheless, the access node A is not restricted to any of the above given examples of access nodes and can be any other access node of a suitable communication standard which allows mobility of roaming users/terminals. In addition, similarly as access node A, target access nodes B, C are shown. A target access node is an access node to which a handover can be performed. Access nodes B, C can be of the same type and/or underlying communication system in case of an intra-network handover, but can also be different access node types in case of inter-network system handovers. For example, assuming access node A being a Node_B, then access node B might be an eNB while access node C might still be a base station BS. Each access node defines a coverage area which is also referred to as serving area or cell A, B, C. Assuming downward compatibility, a E-UTRAN terminal may be roaming to/in all serving areas.

In order to keep illustration simple, terminals or user equipments UE1 . . . UE4 have been illustrated only in serving area A. However, other terminals (not shown) may be present in serving areas B, C, of the target access nodes. Each user equipment has associated thereto certain mobility management properties. Mobility management properties of each of the respective terminals may comprise at least one of the following parameters: location of the terminal and/or variation thereof, indicated as Pos1-Pos4 and/or Δ Pos1-Δ Pos4, respectively; travelling speed of the terminal and/or variation thereof indicated as $V_1$ to $V_4$ and/or $\Delta V_1$ to $\Delta V_4$; traveling direction of the terminal and/or variation thereof as illustrated by the respective speed vectors in FIG. 1; received signal strength indicator RSSI for terminal and/or variation thereof as indicated by $(\Delta)RSSI_1$ to $(\Delta)RSSI_4$; and/or bit error rate BER for terminal and/or variation thereof as illustrated as $BER_1$ to $BER_4$ and/or $\Delta BER_1$ to $\Delta BER_4$. Those mobility management properties as explained with reference to the above parameters are only examples of properties and examples of respective parameters.

More generally, the present invention may be implemented using any of previously known mobility management properties and/or mobility management parameters as long as they allow to be correlated to each other for grouping purposes. This will be explained later on.

The terminals UE1 . . . UE4 may conform to the communication standard "dictated" by the access node in which they currently camp. Nevertheless, one or more of the user equipments/terminals can be capable to conform to multiple access technologies and/or standards so as to allow for inter-communication system handovers. For example, a UMTS terminal is normally capable to roam also to GSM systems so as to be downward compatible in terms of technology evolutions. Furthermore, not shown in FIG. 1 is an access node controlling instance such as a base station controller BSC under GSM system or a radio network controller RNC in UMTS. Each of the access nodes has a corresponding interface to allow communicating with a RNC/BSC (or similar network element depending on the communication network system concerned, e.g. an entity of the evolved packet core EPC network in E-UTRAN to which an eNB is connected via an S1 interface). Moreover, each access node is interfacing with at least one of its "neighboring" access nodes. Such interface is for example denoted as X2 interface between eNBs in case the access nodes are eNBs.

In another scenario such as UTRAN, such interface is not a direct interface like the X2 interface, but an indirect interface; i.e. from one Node_B via an Iub interface to the associated RNC and from the RNC again via an Iub interface to the other, neighboring Node_B.

In still another scenario, and as mentioned before, access nodes may be access nodes of different access technologies, such as GSM, UTRAN, E-UTRAN. In such constellations, a handover is a so-called inter-system handover or inter-RAT (Radio access technology) handover. Also in such exemplary scenarios of the invention, indirect interface(s) between access nodes exists so that they may exchange the necessary information within the network or networks so that there is information transfer between access nodes within the network(s) side. Such indirect interfaces may, in some but not necessarily in all possible scenarios, also involve a gateway within the signaling path of such indirect interface.

It is worth being noted that although access node A is described herein above as the serving access node, access node A may also take the role of a target access node. For example, terminals (not shown) currently camping in the coverage area B associated to access node B may roam to access node A's coverage area so that for those terminals, access node B is the serving access node and access node A may become the target access node. Similarly, this holds for the role of access node C that may be a serving as well as a target access node.

Figure 2:
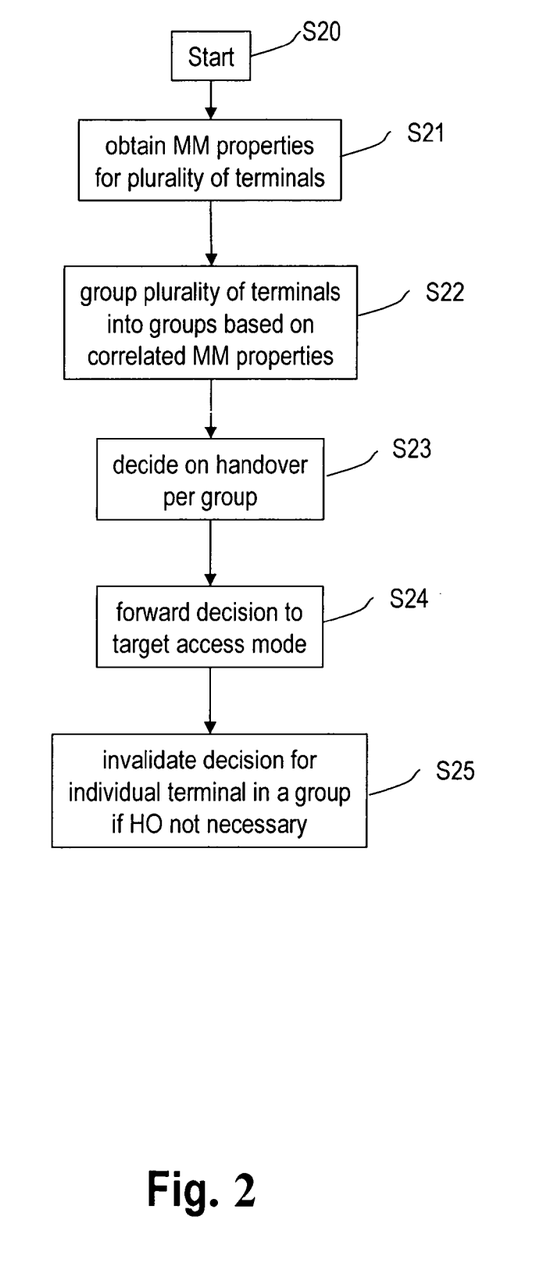
FIG. 2 a basic flow chart of the method aspect.

Now, with regard to a method aspect involved in the present invention, FIG. 2 shows a basic flow chart of the method.

The process starts in step S20. In the following step S21, mobility management properties are obtained for a plurality of terminals. This is done by each respective access node at which the method is implemented. Insofar, the method is implemented in each access node or with effect for each individual access node. This means, that the method can be implemented at an access node or at an access node control instance that takes care of the method being implemented/effective for that access node. However, in order to improve signalling speed and to reduce signalling overhead over network interfaces, it is beneficial to implement the method at each access node individually.

In order to obtain mobility management properties, various possibilities exist. For example, mobility management properties can be received, at the access nodes, that were measured by the access node itself for the plurality of terminals. Alternatively, mobility management properties can be received, at the access node, that were measured by each of the plurality of terminals. Still further alternatively, both ways of receiving mobility management properties can be combined. Then, the mobility management properties used for a further processing in connection with the present invention can be derived based on a combination of those properties received via the different ways, e.g. by weighting the respective properties with respect to each other, or by calculating an average, or by selecting those properties having the lowest value. E.g. with regard to signal strength or bit error rate since in this relation, the lowest values may experience the "biggest need" for a handover, or to select the biggest values in terms of velocity or position variation, since in this regard those properties may necessitate with highest probability a handover.

Then, in step S22 the method performs grouping of a plurality of terminals into groups based on the correlated mobility management properties. In this regard, the grouping may be based on correlating at least one of common mobility management parameters in the obtained mobility management properties. For example for user equipment UE1, all above-mentioned parameters and variations in time thereof RSSI1, BER1, POS1 and V1 are available. On the other hand, due to certain restrictions (not set out in greater detail here) for UE2, it is assumed that only the position and/or position variation in time is available. Then, user equipments UE1 and UE2 are correlated only with respect to that commonly available mobility management property/parameter. Nevertheless, in case more than one common mobility management parameter is available for plural user equipments, the grouping can be based on correlating more than one of those parameters.

Once groups have been formed, step S23, a decision on a handover is performed on a per group basis. Thus, in contrast to other previously known handover scenarios which decide on handover for each terminal individually, in the present invention, correlation of multiple user's mobility management properties is taken into account for mobility management, i.e. handover decisions.

Once a decision on handover per group, i.e. for each group that was resulting from the grouping has been taken, the decision is forwarded to the respective identified target access node, step S24, for the respective group. Such decision is forwarded to the respective target access node via a direct (e.g. X2) interface between the access nodes or via an indirect (e.g. Iub->RNC->Iub) interface between the "neighboring" access nodes. It should be noted that in case plural groups are identified within a serving access node's area, plural target access nodes may be determined, one for each group.

Furthermore, the method provides, at least under an aspect thereof, the possibility to invalidate, step S25, a decision on the necessity for handover for an individual terminal in a group. This handover decision can be invalidated for an individual terminal if the obtained mobility management properties of the individual terminal, after the deciding, do not necessitate a handover any longer.

The deciding further comprises, under an aspect thereof, to evaluate at least one set of mobility management properties associated to one of the terminals of a group. In this regard, the deciding further comprises marking at least one set of mobility management properties that is received prior to other sets of mobility management properties associated to terminals of the group for being evaluated for deciding.

That is, one or more of the terminals within a group is/are used as a reference terminal(s) in order to base the decision for handover on measurements on MM properties related to that terminal. This can be the MM property set(s) received first at e.g. the access node, to thereby speed up the decision making. Alternatively, a most reliably received MM property set can be marked, or even other marking criteria can be applied.

It is to be understood that the above-outlined method can be implemented by a computer program product. Such computer program product comprises software code portions which, when executed on a processor, perform the method according to any of the preceding method aspects. Such computer program product may be a storage medium carrying the software code portions such as a RAM, or ROM or EPROM or the like. It can be produced and/or shipped independently of access nodes. It can be downloaded to an access node or installed manually to an access node, e.g. in the form of a memory module or chipcard or the like. As mentioned beforehand, it is not necessarily required to install the software code at the access node itself but it can also be installed at an access node controlling instance such as an RNC or BSC, or at an entity of an EPC. However, certain advantages are achieved when implementing the method and/or computer program product at the access node or at each access node, respectively, as such.

Figure 3:
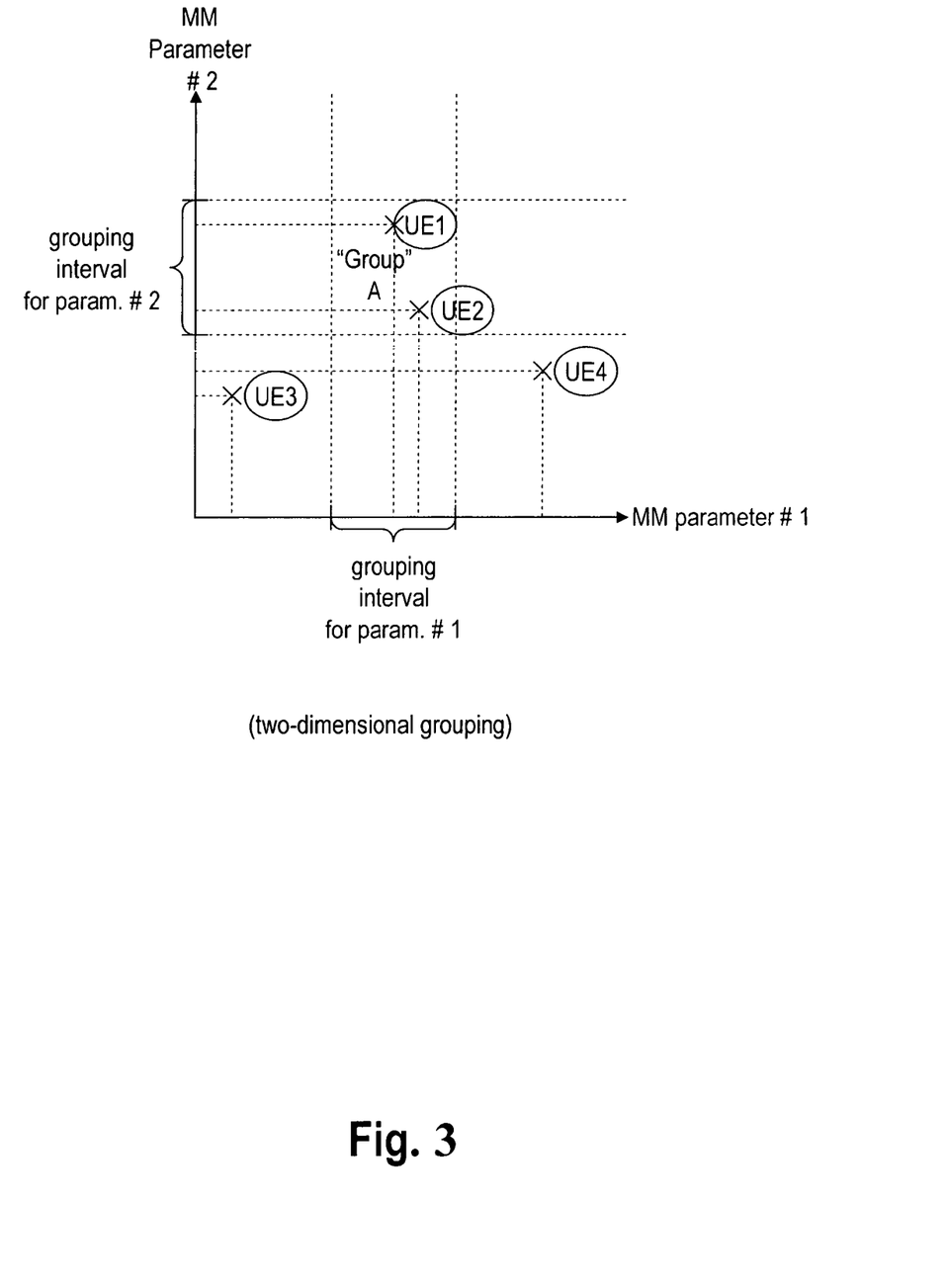
FIG. 3 a simplified diagram for illustrating an example scenario of grouping.
Figure 4:
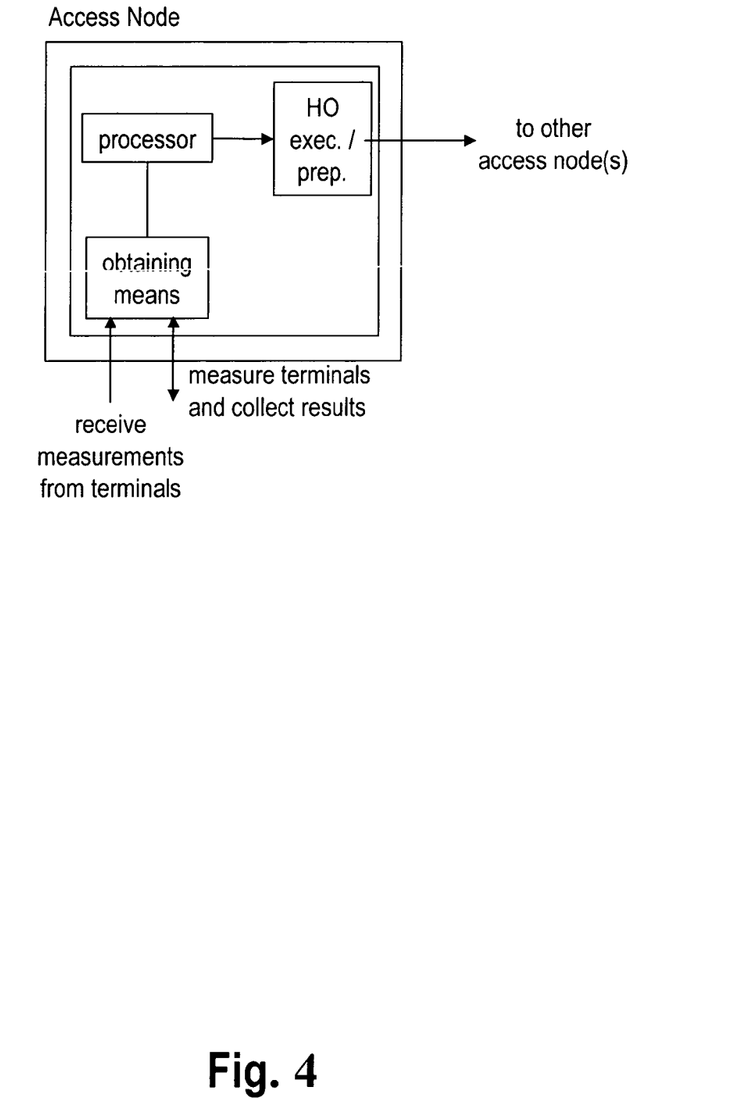
FIG. 4 a rough block circuit diagram of an apparatus/module/access node insofar as related to aspects of the invention.

FIG. 3 shows a simplified diagram for illustrating an example scenario of grouping. In horizontal direction, a first mobility management parameter is illustrated and in vertical direction a second mobility management parameter is illustrated. For each of the mobility management parameters MM parameter #1, #2, a respective so-called grouping interval is defined. The grouping interval location with regard to the respective axis as well as a width thereof can be dependent on a respective mobility management parameter and can be different for different mobility management parameters. FIG. 3 shows an example scenario for basing the grouping on correlating two common mobility management parameters, namely MM parameter #1 and MM parameter #2. However, at least one common mobility management parameter has to be present in order to perform correlating and subsequent grouping. In addition, a three-dimensional grouping based on three parameters, or more generally an n-dimensional grouping based on n-mobility management parameters is possible. The more mobility management parameters are used for correlating and grouping, the "finer" the correlation for the grouping may be expected to be. As shown in FIG. 4, a respective measurement value for mobility management parameter #1 of each of the terminals UE1 to UE4 is illustrated in the two-dimensional coordinate system. Moreover, a respective value of the second mobility management parameter #2 is illustrated for each of the terminals UE1 to UE2. Both parameters together constitute the coordinates of the respective "x" in the two-dimensional field. Those terminals whose values fall in a respective grouping interval for both parameters, as shown this applies for terminals UE1 and UE2, will be regarded as being correlated and thus grouped together to form group A. For example, referring back to FIG.

1, user equipments UE1 and UE2 are grouped based on their vicinity for example, POS1, POS2 and/or their speed and speed direction V1, V2. Other criteria may optionally additionally apply. UE3 and UE4, respectively, are located further away compared to UE1/UE2 and their speed; in particular their travelling direction V3 and V4 deviate to a certain extent from those of UE1/UE2 so that they do not form part of group A. In the illustrated example, they do not even correlate to an extent that would allow grouping UE3 and UE4 to another group.

Although the above description of the present invention has mainly been focusing up to now to a method and/or computer program product performing the method, it is evident that also the invention can be implemented in an apparatus. Such apparatus is illustrated as a rough block circuit diagram in FIG. 4. For the description of FIG. 4, it is assumed that the apparatus is implemented in an access node. The apparatus can be part of the access node such as a module, chip or chipset or ASIC, DSP or the like. Nonetheless, it need not necessarily be implemented at the access node site but may also be realized at an access node controlling instance such as a RNC or BSC.

In any case, from an apparatus point of view, such apparatus comprises an obtaining means configured to obtain mobility management properties for a plurality of terminals served by an access node. The obtaining means illustrated in FIG. 4 are adapted to receive measurement results from terminals or to arrange for measuring terminals and collecting the results therefrom at this own (i.e. at the access node). The obtaining means can be configured in either one of the outlined ways or in both of the outlined ways, similarly as described above in regard of the method. Moreover, as the apparatus is configured to perform the method as described in detail herein above, the processing means is also configured to process the mobility management properties of a respective terminal which comprise at least the same parameters as set out in detail with regard to the method. In particular, reference can be made to FIG. 1 in terms of the parameters.

The processor performs all necessary processing steps like correlating, grouping and deciding described above, as well as forwarding a taken decision to another access node or plural other access nodes. Once a decision has been taken, the processor performs a handover execution or at least a handover preparation in this regard in cooperation with a HO exec/prep means, which also comprises transmitter functionality so as to communicate with other access nodes via an interface such as an X2 interface between access nodes.

In addition, the processor is configured to invalidate a decision on the necessity for handover for an individual terminal as described in relation to the method aspect. Likewise, the processor is configured to take decisions/evaluations/markings in the same manner as described in relation to the method.

Figure 5:
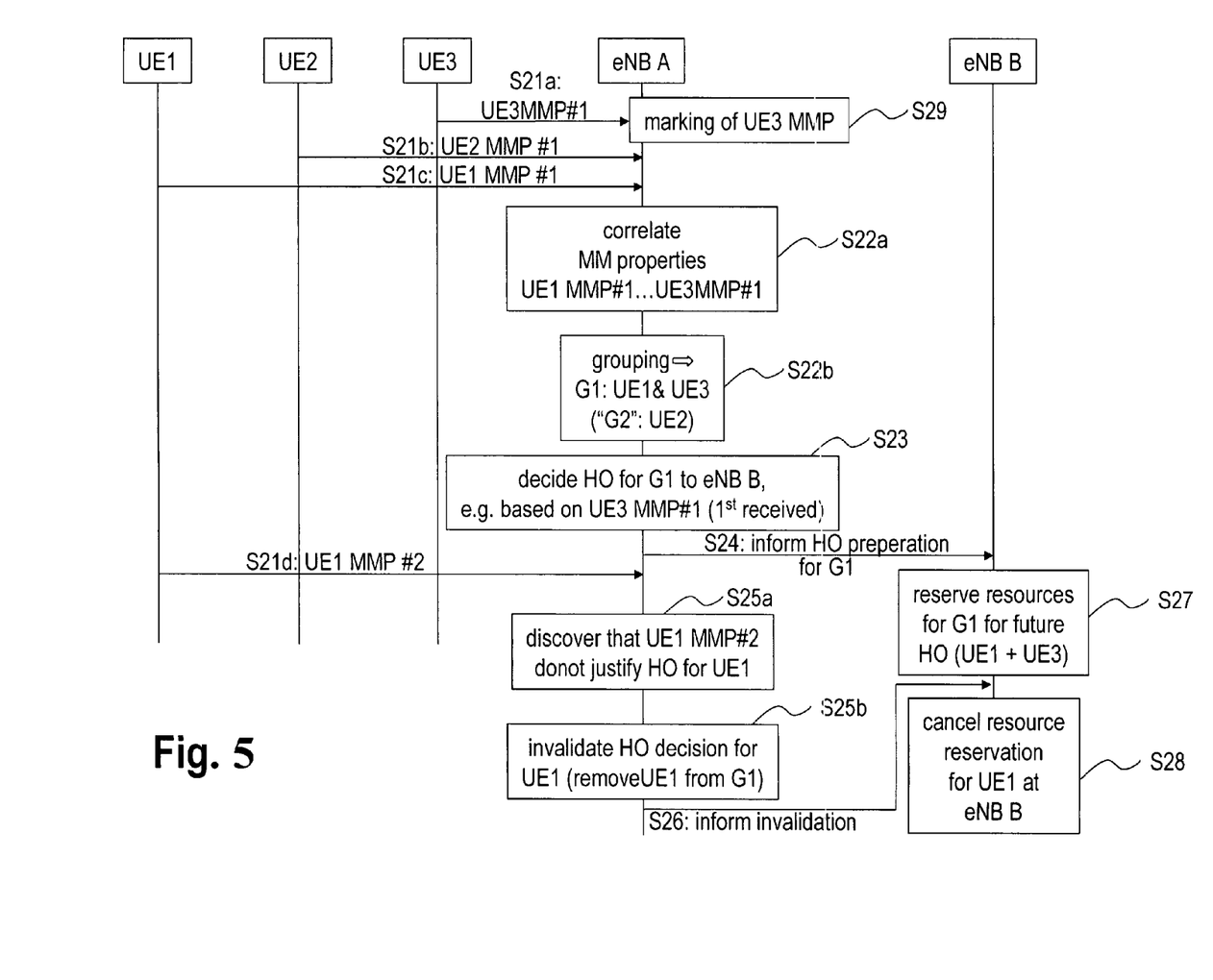
FIG. 5 a signaling diagram related to plural aspects of the present invention.

FIG. 5 shows a signalling diagram illustrating at least some aspects of the present invention. In vertical direction, the signalling/processing of entities is represented in time sequence, and in horizontal direction, the system constituents involved in this scenario are indicated. In order to keep the description simple, user equipments UE1, UE2 and UE3 are illustrated. Still further, access nodes eNB A and eNB B are illustrated. In a step S21a, user equipment UE3 sends user equipment 3's mobility management parameters at a first time instant to eNB A, S21A: UE3 MMP #1. Access node eNB A; in step S29; then marks the mobility management properties of UE3 for use in subsequent deciding steps. In this regard, UE3 MMP #1 is marked because it is the first received mobility management property. Other criteria for applying the marking of certain mobility management properties are applicable, but not illustrated herein in detail. Similarly, in step S21b, user equipment UE2 sends the mobility management properties at the first instant for UE2 to access node A, and likewise, this applies for user equipment 1 in step S21c. Thus, access node A obtains mobility management properties for a plurality of terminals in steps S21a, b and c.

Subsequently, the access node A processes the mobility management properties in that it correlates the mobility management properties received in the preceding steps. This is done in step S22a. Thereafter, based on the correlation, the access node A performs grouping. In the illustrated example, it is assumed that user equipment UE1 and user equipment UE3 are grouped to form group G1, while user equipment UE2 does not form part of this group and can be regarded as group G2. This is done in step S22b.

Subsequently, in step S23, access node A decides on a handover for group G1 to a target access node, eNB B. This decision is for example based on the first received mobility management prosperities MMP #1 of user equipment 3 (as those were marked for this purpose previously). Since the decision for handover has been taken, in step S24 the access node A informs the target access node B to this extent. This information is sent in the message to the target access node so as to initiate at least a handover preparation for the terminals UE1 and UE3 of group G1. Such preparation does not necessarily need to result in an actual handover. Nevertheless, in certain scenarios, instead of merely informing the target node of the need to prepare for a handover, also an instruction to perform handover can be sent. The target access node eNB B then, in step S27, reserves resources for user equipments of group G1 for a future handover. This will then lead to resource reservation for terminals UE1 and UE3 that are predicted and/or expected to be handed over to eNB B as a future serving node.

In the meantime, since a serving access node continuously and/or regularly obtains mobility management properties of terminals and/or terminals continuously and/or repeatedly/regularly report mobility management properties, in step S21d, a second set of mobility management properties for user equipment UE1 (UE1 MMP #2) is received at eNB A. The precise timing of this second set of mobility management properties for UE1 is not crucial as long as it is received after the first one. In a follow up step S25a, the access node eNB A then discovers that the second set of mobility management properties for UE1, UE1 MMP #2 does not justify a handover for UE1 any longer. Reasons for this can reside in that UE1 has been switched off or that the mobility management properties/parameters have changed in the meantime. Then, in step S25b, access node A decides to invalidate the handover decision for UE1. This can be regarded as removing UE1 from group G1 to which is was assigned previously. Then, in step S26, this invalidation is informed to the potential target access node eNB B which has reserved already resources for UE1 in step S27. Once being informed of this invalidation ("false alarm indication") the target access node eNB, step S28, cancels the resource reservation for UE1 at the access node B. The freed resources can then be used for other purposes and/or terminals.

Signalling between access nodes A and B in the illustrated scenario preferably takes place over the X2 interface between these nodes. It is to be noted that the information of the handover (preparation/decision) in step S24 is sent in the network side only and not to the individual users over the air interface. Furthermore, although step S24 illustrates the handover preparation decision to be informed in a single signalling only, it can be split into a plurality of signallings, one for each group member, or plural signalings for a subset of group members, as required.

Also, in a modification (not shown), e.g. eNB B can be replaced by a Node_B B. Then, an inter-system handover or inter-RAT handover will be prepared in the same manner as described above. In such a case, the interface between eNB A and Node_B B will be an indirect interface, as described above.

Figure 6:
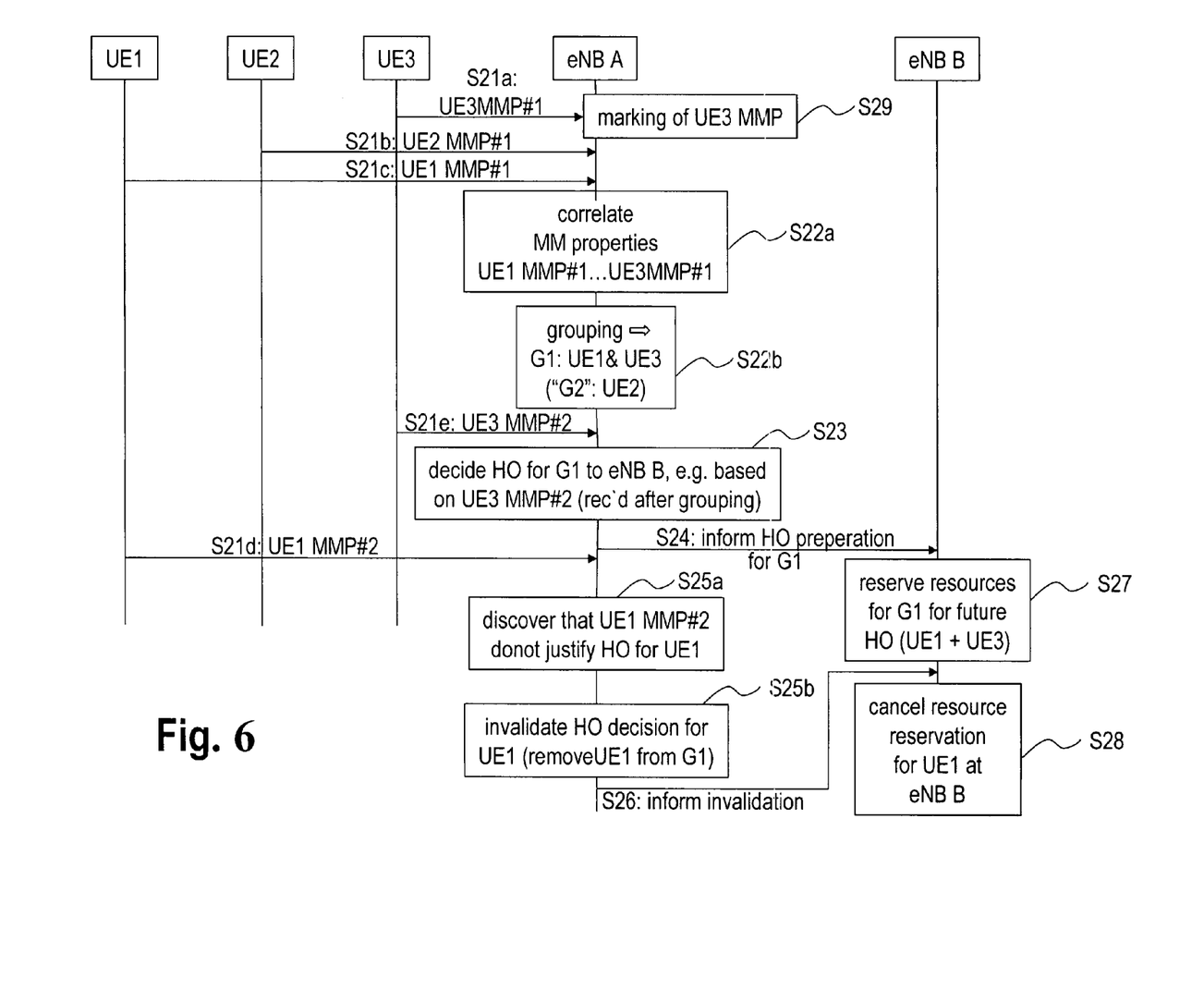
FIG. 6 shows a further modification in terms of a signaling/processing scenario.

FIG. 6 shows a further modification in terms of a signaling/processing scenario. FIG. 6 is identical to FIG. 5 with the exception that grouping of the users and handover decision are separated in time as grouping of users can be done much earlier than handover decision on the group of users. In FIG. 6, UE3 MMP is still marked in Step S29 so as to use UE3's mobility management parameters MMP as a basis for handover decision. However, the decision for handover is not taken on the basis of UE3 MMP#1 received in S21a, but the handover decision is taken on the basis of subsequently received mobility management parameters UE3 MMP#2, received in an additionally illustrated Step S21e. Thus, in FIG. 6 there is one more set of MMP received from UE3 that triggers handover preparation to target node. However, a decision could also be triggered based on e.g. a second set UE1 MMP #2 parameters (not shown) received from UE1 (in such case, the marking of UE3 would signify that UE3's MMP's shall not be used for decision but be based on another group member's parameters).

Still further, also not shown, in a modification also the marking step S29 in FIGS. 5 and 6 can be shifted in time, e.g. to be performed but after correlation or but after grouping. Marking could be applied in a positive or negative sense as described above, i.e. signify to use or not to use MMP's of certain UE's for a HO decision. Moreover, marking can be applied to a set of MMP's first received, as explained, or received at a different time, e.g. last received. Nevertheless, marking can be applied e.g. to a terminal UE with a set of MMP's having at least one value that is closest to a (pre) determined value (fixed one or average value) within at least one grouping interval (see FIG. 3), or marking can be based on other criteria, e.g. based on timing or statistical evaluations of the parameter values, or any combination thereof.

Stated in other words, according to at least exemplary examples of the present invention, scenarios are presented that are as follows.

In this invention, the correlation among multiple users' mobility management parameters such as location and travelling speed is explored to make predictive mass handover control on the group of the users. Features thereof are at least some of the following:

An access node such as a base station (BS) groups users together based on certain similarity levels of measurements (measured and sent to BS by users and/or measured by BS) in terms of e.g. user's location. The location can be determined in various ways, e.g. based on Global Positioning System, GPS signaling, measured signal strength variation, etc. Travelling speed can be determined e.g. based on measures of Doppler frequency, signal strength variation, user location variation, etc.

Due to the different measurement report/updating interval and/or radio sensitivity, BS makes mass handover decision for the group of users based on the measurement report(s) from one or several users of the group. Advantageously of those ones earliest received to avoid further delays.

Mass handover preparation procedure of the group of users is forwarded over the direct or indirect BS-to-BS interface (e.g. X2 interface in E-UTRAN) to shorten interruption time during handovers.

An invalidation referred to as "false alarm indication" of partial/individual users in a group from source BS to target BS is enabled for quicker release of reserved resources in a target BS, if an individual measurement report of those partial users doesn't trigger a handover decision in the source BS (or if some of those partial users terminate their calls right after a source BS carried out mass handover preparation procedure with target BS and do not need a handover any longer).

More particularly, using E-UTRAN as an example to exemplify possible implementations, but bearing in mind that the invention is not limited to the E-UTRAN system but applicable to any mobility supporting environment and even to combinations of different mobility supporting environments such as combinations of GSM, UTRAN, and E-UTRAN, aspects of the invention can be implemented as follows. If individual feature implementations offer alternative implementations, alternatives of one feature may be freely combined with alternatives of one or more other features, if desired and as long as they are not mentioned to be mutually exclusive. Thus, exemplary embodiments of the present invention cover all possible permutations of alternative feature implementations.

"Correlated Users Grouping" Feature:

An eNB makes the cross correlation checking on the measurements of UEs' MM properties, e.g. location and travelling speed, to group the correlated users together. Cross correlation checking of a new user to be allocated to a group can be based on a randomly selected member of the respective group or a nominated/virtual reference member of the respective group.

"Mass Handover Decision and Preparation" Feature:

An eNB makes a handover decision on the group of users based on the measurement reports from one or several of the users in the group.

The eNB send a mass handover request/preparation message to a target eNB over an X2 interface. Such mass handover request can be put into one single message. Or, the source eNB sends multiple handover requests in that each request is for one UE or a subset of UEs of a group to a target eNB. A single message reduced signaling overhead, while at least plural messages increase reliability.

A target eNB makes mass admission control and resource reservation for the group of users and responds to a mass handover request with an acknowledgement message (not shown in FIG. 5) to the source eNB.

"False Alarm Indication" Feature (Individual HO Invalidation):

The validation of the handover decision on each user in the group is checked e.g. within a certain time period (e.g., timer based) after the decision has been taken, and/or upon receipt of a new set of mobility management properties from a respective terminal. If a measurement report from a UE subjected to the checking/validation in the group doesn't exceed a level to trigger the handover decision before the validation timer expires, a "false alarm indication" is sent by the source eNB to the target eNB to release the resource reservation for the UE. Insofar, the previous group based HO decision in relation to such a terminal is invalidated.

For the purpose of the present invention as described herein above, it should be noted that an access technology may be any technology by means of which a user equipment can access an access network (e.g. via a base station BS or Node_B or E-UTRAN Node_B (eNB), or generally via an access node). Any present or future technology, such as GSM (Global System for Mobile Communication), UMTS (Universal Mobile Telephone System), WLAN (Wireless Local Access Network), WiMAX (Worldwide Interoperability for Microwave Access), BlueTooth, Infrared, and the like may be used; the above technologies are wireless access technologies in order to allow roaming to users; access technologies may be distinguishable in at least two categories or access domains such as packet switched and circuit switched, but the existence of more than two access domains does not impede the invention being applied thereto, an access node of an access network may be any device, apparatus, unit or means by which a station, entity or other (user) equipment or terminal may connect to and/or utilize services offered by the access network; such services include, among others, data and/or (audio-)visual communication, data download, exchange of media, etc.;

a user equipment or terminal may be any device, apparatus, unit or means such as a mobile phone, personal digital assistant PDA, or computer etc., by which a user may experience services via an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

The invention claimed is:

1. A method, comprising:
at a serving network access node, obtaining mobility management properties for a plurality of terminals served by the serving network access node,
grouping at the serving network access node the plurality of terminals into groups based on correlating the obtained mobility management properties of the plurality of terminals,
deciding on a necessity for a handover per group of terminals to form a decision, and
forwarding information indicative of the decision from the serving network access node to a target network access node via a network interface established between serving network access node and the target network access node;
where the method further comprises invalidating, at the serving network access node, a decision on the necessity for handover for an individual terminal in a group, if the obtained mobility management properties of the individual terminal after the deciding do not necessitate a handover of the individual terminal; and where
deciding further comprises evaluating at the serving network access node a set of mobility management properties associated with a reference terminal, where the set of mobility management parameters associated with the reference terminal are mobility management properties that are received prior to other sets of mobility management properties associated with other terminals of the group.

2. The method according to claim 1, wherein the obtaining comprises at least one of receiving mobility management properties measured by the serving network access node for the plurality of terminals, and receiving mobility management properties measured by each of the plurality of terminals.

3. The method according to claim 1, wherein the mobility management properties of a respective terminal comprise at least one of the following parameters:
location of the terminal and/or variation thereof,
traveling speed of the terminal and/or variation thereof,
traveling direction of the terminal and/or variation thereof,
received signal strength indicator for a terminal and/or variation thereof,
bit error rate for a terminal and/or variation thereof.

4. The method according to claim 1, wherein grouping further comprises correlating at least one common mobility management parameter in the obtained mobility management properties.

5. The method according to claim 1, wherein forwarding further comprises sending at least one handover preparation request related to one or more terminals of a group from the serving network access node to the target network access node.

6. The method according to claim 5, wherein the sending of the handover preparation request takes place via the network interface between the source network access node and the target network access node.

7. The method according to claim 1, wherein the invalidating of the decision further comprises sending an invalidation request related to the individual terminal to the target network access node.

8. The method according to claim 7, wherein the sending of the invalidation request takes place via an interface between the source network access node and the target network access node.

9. A computer program product, comprising software code portions stored on a non-transitory computer readable medium which, when executed on a processor that comprises a part of the source network access node, perform the method according to claim 1.

10. An apparatus, comprising:
   a processor embodied at a serving network access node; and
   a memory embodied at the serving access node to store computer program code, where the computer program code is configured when executed by the processor to cause the serving network access node to perform,
   obtaining mobility management properties for a plurality of terminals served by the serving access node,
   grouping the plurality of terminals into groups based on correlating the obtained mobility management properties of the plurality of terminals,
   deciding on a necessity for a handover per group of terminals to form a decision,
   forwarding information indicative of the decision from the serving access node to a target access node via a network interface established between serving network access node and the target network access node; and
   invalidating, at the serving network access node, a decision on the necessity for handover for an individual terminal in a group at the serving network access node if the obtained mobility management properties of the individual terminal after the deciding do not necessitate a handover of the individual terminal to the target network access node; where
   deciding further comprises evaluating at the serving network access node a set of mobility management properties associated with a reference terminal, where the set of mobility management parameters associated with the reference terminal are mobility management properties that are received prior to other sets of mobility management properties associated with other terminals of the group.

11. The apparatus according to claim 10, wherein the obtaining comprises at least one of receiving mobility management properties measured by the serving network access node for the plurality of terminals, and receiving mobility management properties measured by each of the plurality of terminals.

12. The apparatus according to claim 10, wherein the mobility management properties of a respective terminal comprise at least one of the following parameters:
   location of the terminal and/or variation thereof,
   traveling speed of the terminal and/or variation thereof,
   traveling direction of the terminal and/or variation thereof,
   received signal strength indicator for a terminal and/or variation thereof,
   bit error rate for a terminal and/or variation thereof.

13. The apparatus according to claim 10, wherein grouping further comprises correlating at least one common mobility management parameter in the obtained mobility management properties.

14. The apparatus according to claim 10, wherein forwarding further comprises sending at least one handover preparation request related to one or more terminals of a group from the serving network access node to the target network access node.

15. The apparatus according to claim 10, wherein the sending of the handover preparation request takes place via the network interface established between the source network access node and the target network access node.

16. The apparatus according to claim 10, wherein invalidating of the decision further comprises sending an invalidation request related to the individual terminal to the target network access node.

17. The apparatus according to claim 16, wherein the sending of the invalidation request takes place via the network interface established between source network access node and the target network access node.

18. The apparatus according to claim 10, wherein the source network access node is an eNB, the target network access node is an eNB, and the network interface is comprised of an E-UTRAN X2 interface.

* * * * *